United States Patent [19]

Obiya et al.

[11] 4,111,101
[45] Sep. 5, 1978

[54] APPARATUS FOR CLOSING GUIDE VANES OF A HYDRAULIC MACHINE

[75] Inventors: Yasuaki Obiya, Kawasaki; Saburoo Ikeda, Sagamihara, all of Japan

[73] Assignee: Tokyo Shibaura Denki Kabushiki Kaisha, Japan

[21] Appl. No.: 781,427

[22] Filed: Mar. 25, 1977

[30] Foreign Application Priority Data

Mar. 29, 1976 [JP] Japan .................................. 51-34997

[51] Int. Cl.² ........................................... F15B 15/22
[52] U.S. Cl. ......................................... 91/405; 60/325; 60/394; 60/461
[58] Field of Search ................... 91/38, 364, 365, 404, 91/405; 251/118; 415/148; 60/332, 342, 347, 354, 355, 356, 394, 325, 461

[56] References Cited

U.S. PATENT DOCUMENTS

| | | | |
|---|---|---|---|
| 1,103,891 | 7/1914 | Pfau | 91/364 |
| 2,157,707 | 5/1939 | Keel | 60/461 X |
| 2,500,797 | 3/1950 | Bullard | 60/461 X |

*Primary Examiner*—Edgar W. Geoghegan
*Attorney, Agent, or Firm*—Stevens, Davis, Miller & Mosher

[57] ABSTRACT

An apparatus for closing the guide vanes of a water turbine, for example, by means of a servo-motor controlled by a distributing valve responsive to the variation in the speed of the water turbine. The closing speed of the servo-motor is controlled to vary stepwisely by controlling the flow of the operating oil discharged from the servo-motor by a throttle control valve. The throttle transfer valve is controlled by first and second fluid actuators which are controlled by a first transfer valve operated by the closing operation of the servo-motor, a second transfer valve, and a time delay means.

6 Claims, 6 Drawing Figures

APPARATUS FOR CLOSING GUIDE VANES OF A HYDRAULIC MACHINE

BACKGROUND OF THE INVENTION

This invention relates to apparatus for closing the guide vanes of a hydraulic machine, more particularly apparatus for stepwisely closing the guide vanes of a water turbine or a pump turbine at different closing speeds.

Figure 1:
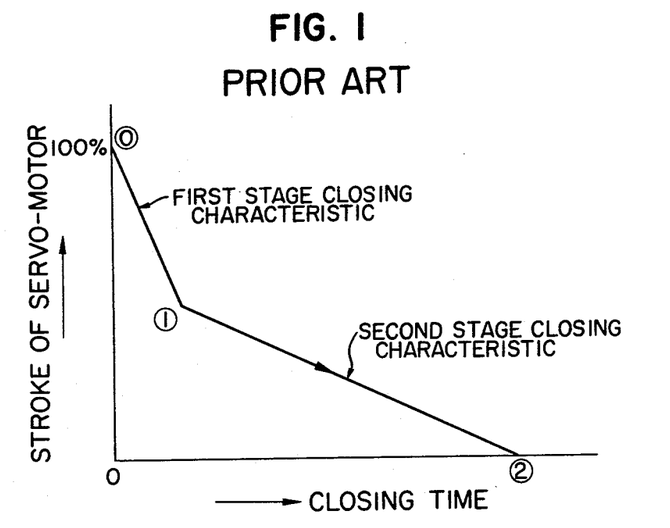
FIG. 1 is a graph showing the closing characteristics of a prior art method of closing guide vanes.

In the operation of a Francis type water turbine or a pump turbine it is often necessary to interrupt the load or to stop the running at the time of an emergency. In such case, according to prior art closing apparatus, the guide vanes are rapidly closed according to a first stage closing characteristic depicted as 0–1 in FIG. 1 and then closed relatively slowly according to a second stage closing characteristic 1–2 until the guide vanes are completely closed. Such closing characteristic is termed a quickslow two stage closing system. However, in a case where the length of the penstock is long and the flow quantity varies greatly with the number of revolutions as in high head pump turbines, the hydraulic pressure rise caused by water hammer is so great that it is necessary to greatly reduce the closing speed of the guide vanes when the flow quantity is small.

In the case of the two stage closing operation described above, it takes a long closing time at the slow closing stage so that the vanes are subjected to such adverse conditions as vibration, centrifugal force and fluctuation of the hydraulic pressure for a long time before they are returned to the no load opening. Moreover, during normal running as the closing speed of the guide vanes is low its load response characteristic is poor.

Figure 2:
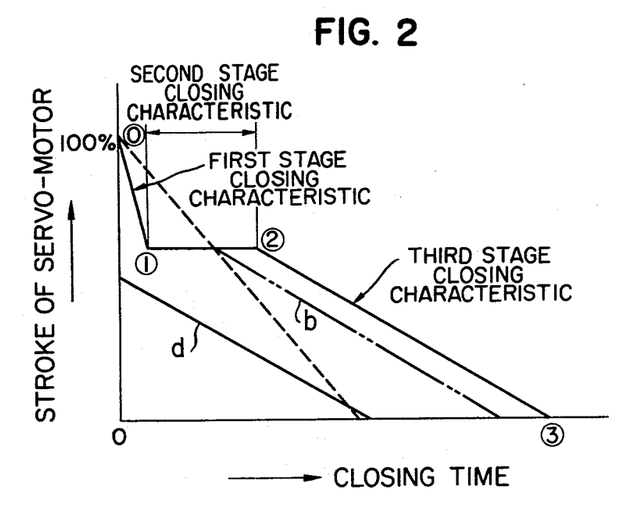
FIG. 2 is a graph showing the closing characteristics of guide vanes obtained by the apparatus of this invention.

To solve this difficulty we have already proposed a method wherein, upon occurence of a load variation, the guide vanes are closed rapidly according to a first stage closing characteristic 0–1 as shown in FIG. 2, slowly closed according to a second stage closing characteristic 1–2 under a running condition in which the flow quantity decreases greatly as the speed of the water turbine increases, and finally closed relatively rapidly according a third closing characteristic 2–3 thereby interrupting the flow of water. (see Japanese patent application No. 16602/1970 which was published as patent publication No. 40902/1974)

SUMMARY OF THE INVENTION

It is an object of this invention to provide apparatus for closing guide vanes of a hydraulic machine suitable for carrying out the method described above.

Another object of this invention is to provide improved apparatus for closing guide vanes of a hydraulic machine capable of providing an optimum closure control of the guide vanes by selecting optimum closing characteristic by using hydraulic actuators for stepwisely varying the closing speed of the guide vanes.

According to this invention there is provided apparatus for closing guide vanes of a hydraulic machine, characterized by a servo-motor for operating the guide vanes; a distributing valve responsive to the variation in the speed of the hydraulic machine for supplying and discharging operating fluid to and from the servo-motor; a throttle transfer valve for stepwisely varying the flow of the operating fluid discharged from the servo-motor thereby stepwisely varying the closing speed of the guide vanes successively through first, second and third closing speeds; a first fluid actuator for imparting the second closing speed to the throttle transfer valve; a second fluid actuator for imparting the third closing speed to the throttle transfer valve; conduit means for supplying operating fluid to the first and second fluid actuators from a source of operating fluid; a first transfer valve for selectively connecting the conduit means to the source, means responsive to the closing operation of the servo-motor for switching the first transfer valve to an operating position for connecting the conduit means to the source when the servo-motor moves over a first closing stroke; a second transfer valve connected in series with a conduit for supplying and discharging the operating fluid to and from the first fluid actuator, and a time delay means connected to the second transfer valve for discharging the operating fluid from the first fluid actuator when the servo-motor completes a second closing stroke.

DESCRIPTION OF THE PREFERRED EMBODIMENTS

Figure 3:
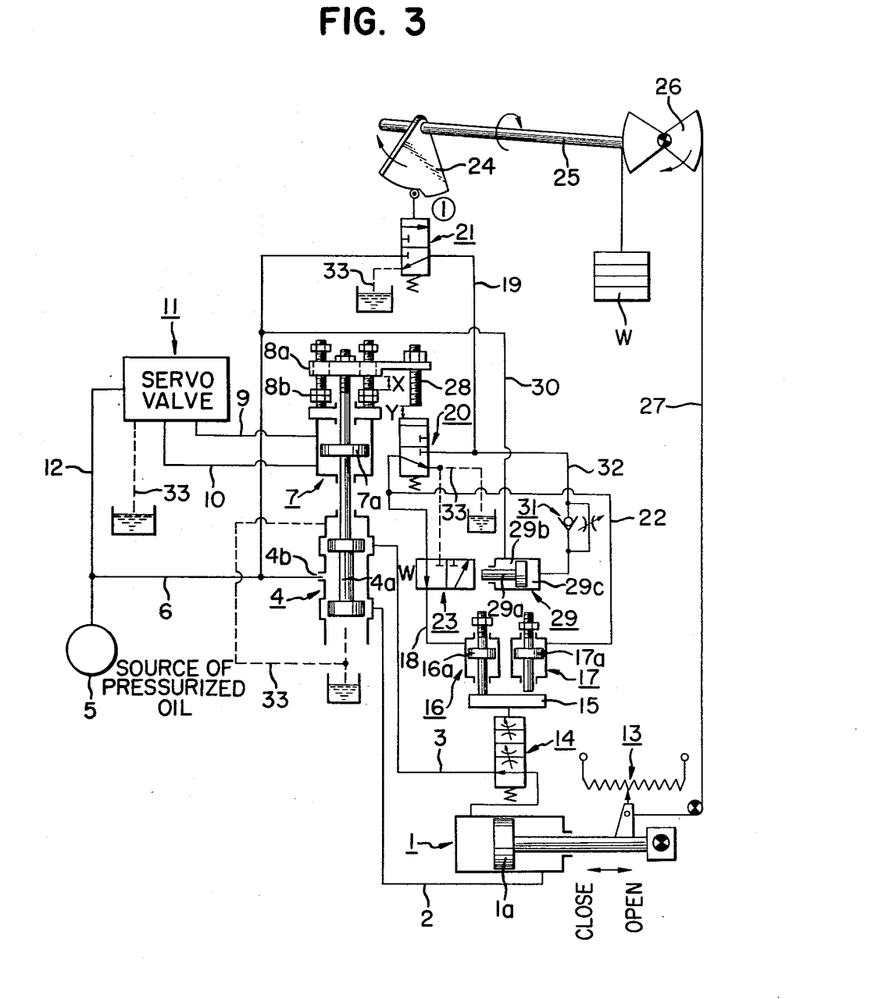
FIG. 3 is a diagram showing one embodiment of the apparatus in partially schematic form for closing the guide vanes of this invention.
Figure 4:
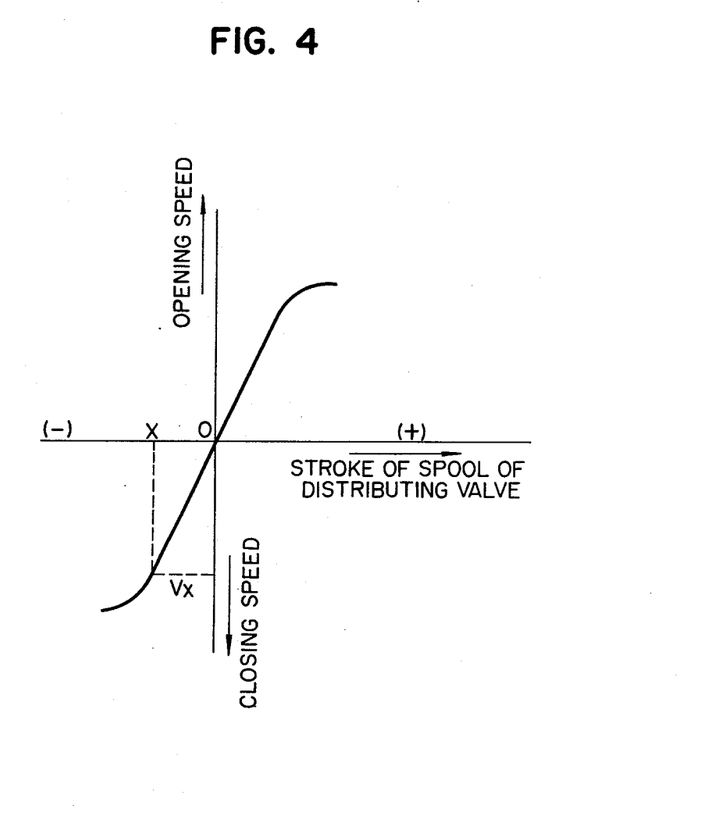
FIG. 4 is a graph showing the relationship between the stroke of the spool of a distributing valve and the speed of a servo-motor.

In a preferred embodiment of this invention shown in FIG. 3, for the purpose of operating guide vanes of a hydraulic machine (turbine or pump), not shown, there is provided a servo-motor 1 which is connected to a pressure distributing valve 4 through conduits 2 and 3. The movement of the piston 1a of the servo-motor 1 is controlled by the displacement of the spool 4a of the distributing valve 4 from the neutral position thereof. The displacement of the spool 4a and the speed of the piston 1a of the servo-motor are substantially proportional as shown in FIG. 4. Pressurized oil is supplied to the inlet port 4b of the distributing valve 4 through a conduit 6 from a source of pressurized oil 5. The spool 4a of the valve 4 is connected directly to the piston 7a of a pilot motor 7 so that the displacement of the spool 4a from the neutral position is controlled by the pilot motor 7 and the stroke of the piston 7a is controlled by a stop lever 8a and a stop 8b. Thus, the piston 7a is stopped at a predetermined maximum stroke X from the neutral position at which the closing speed Vx of the servo-motor 1 is determined (see FIG. 4). The pilot motor 7 is connected to an oil pressure servo-valve 11 via conduits 9 and 10, and the servo-valve 11 is supplied with pressurized oil from the source 5 through a conduit 12. Although not shown in the drawing, the servo-valve 11 is supplied with an electric signal from a turbine speed detector or an output controller of the water turbine and a restoring signal from a potentiometer 13 which converts the movement of the piston 1a of the servo-motor 1 into an electric signal thereby controlling the pilot motor 7 by the output of the servo-valve 11.

In the conduit 3 from the servo-motor 1 is included a throttle transfer valve 14 having three throttle valves for varying the closing speed of the guide vanes in three stages. Normally, a predetermined one of the three throttle valves is used to return the pressurized oil discharged from the cylinder of the servo-motor to a drain tank via the distributing valve 4. The throttle transfer valve 14 is provided with a plate 15 adapted to engage piston rods of first and second independent fluid actuators in the form of piston-cylinder assemblies 16 and 17 for selecting the throttle valves in the throttle transfer valve 14 in accordance with the position of the ends of the piston rods.

One piston-cylinder assembly 16 is connected to conduit 6 via serially arranged conduits 18 and 19, the former including a flow path transfer valve 20 and the latter a first transfer valve 21. These transfer valves are of the normally closed two position transfer valve type. Conduit 18 further contains a second transfer valve 23 of the normally open type for selectively supplying and discharging pressurized oil to and from the piston-cylinder assembly 16. The other piston-cylinder assembly 17 is connected to conduit 18 via a conduit 22.

The first transfer valve 21 is transferred between two positions by cam 24 rotated by a shaft 25, which is rotated by a pulley 26 and a rope 27 connected to the piston 1a of the servo-motor 1. Thus, when the piston 1a is moved in a direction for closing the guide vanes, the rope 27 is pulled downwardly against the weight of a counter weight W thus rotating the pulley 26 and the cam 24 in a clockwise direction. Consequently, when the cam 24 reaches transfer position 1 (see FIG. 2) it switches the first transfer valve 21 to the drain port communication position.

The flow path transfer valve 20 is switched to an operating position by an operating rod 28 secured to the stop lever 8a. The operating rod 28 has an idle stroke Y smaller than stroke X so that X-Y represents the transfer stroke of the flow path transfer valve 20.

The second transfer valve 23 is operated by a piston-cylinder assembly 29 acting as a time delay releasing device. A chamber 29b on one side of piston 29a is connected to the source 5 via conduit 30, while chamber 29c on the opposite side is connected to conduit 19 through a conduit 32 including a combination 31 of a check valve and an adjustable valve. The drain conduits are designated by a reference numeral 33.

The embodiment shown in FIG. 3 operates as follows.

When the water turbine is operating under a high output condition and the servo-motor 1 is in its full open position, as the first transfer valve 21 is at a position communicating with the drain, conduits 19, 18 and 22 are all switched to the drain side or no pressure condition, the throttle transfer valve 14 is maintained in its full open position in which the first stage closing speed is imparted to the servo-motor 1.

When the load is interrupted under such normal operating condition, the speed of the water turbine increases rapidly. A speed detector, not shown, detects such an over speed and applies a closing signal to the servo-valve 11. As a consequence, the pressurized oil from the source 5 is applied in pilot motor 7 via conduit 9 to lower the spool 4a, thereby operating the servo-motor 1 in a direction for closing the guide vanes. This movement of the piston 1a of the servo-motor is detected by potentiometer 13 and its output is transmitted to the servo-valve 11. Since at first the speed detection signal is large, the spool 4a of the distributing valve 4 moves downwardly together with stop lever 8a, and when it descends by stroke length X, the operating rod 28 switches the transfer valve 20 from a drain communicating position to an operating position. Meanwhile, the guide vanes of the water wheel are closed along the first stage closing characteristic 0–1 shown in FIG. 2, and when point 1 is reached, the transfer valve 20 is switched to the operating position.

The rope 27 is pulled in synchronism with the movement of the servo-motor 1 in the direction of closing for rotating cam 24 in the clockwise direction through pulley 26 and shaft 25. As the cam 24 reaches a first transfer point (1 or high point) the first transfer valve 21 is transferred to the operating position from the drain communicating position shown in the drawing. Then the pressurized oil is supplied to the piston-cylinder assembly 16 from conduits 6 and 19 through transfer valve 20, conduit 18 and the second transfer valve 23. Accordingly, the throttle transfer valve 14 is switched to the second throttle passage in proportion to the stroke of piston 16a whereby the guide vanes are closed slowly along the second closing characteristic. At the same time, pressurized oil is supplied to piston-cylinder assembly 17 to lower its piston 17a. The piston 17a stops when the throttle transfer valve 14 is switched to a third restricted passage for assuring a waiting condition. The pressurized oil supplied to the righthand chamber 29c of the piston-cylinder assembly 29 via conduit 32 and the combination 31 of the check valve and the adjustable valve moves piston 29a to the left. When the piston 29a moves to the leftmost position, the second transfer valve 23 is switched to the drain communicating position. Meanwhile, the opening of the guide vanes is maintained at a constant value along the second stage closing characteristic 1–2 shown in FIG. 2. When the second transfer valve 23 is switched to the drain communicating position, conduit 18 will be switched to drain and piston 16a of the piston-cylinder assembly 16 rises so that the throttle transfer valve 14 will assume the third stage throttle position which is set by piston 17a of the piston-cylinder assembly 17 as above described. As a consequence, the guide vanes are closed by servo-motor 1 along the third stage closing characteristic 2–3 shown in FIG. 2. When load is interupted under a condition below the switching point 1 of the first transfer valve 21, the speed which the water turbine reaches becomes lower as the load increases. For this reason, it is not necessary to rapidly close the guide vanes, and the rise in the hydraulic pressure is limited below a permissible value. Accordingly, the guide vanes may be closed along a straight line as in the prior practice.

When the load of the water turbine is interrupted during the closing operation of the guide vanes, since the first and second transfer valves 21 and 23 have already been switched, even when the transfer valve 20 is switched to the drain communicating position by the stop lever 8a, the pressurized oil will be supplied to the piston-cylinder assembly 17 via conduit 22 so that its piston rod will set the trottle transfer valve 14 to the third stage closing speed.

When servo-motor 1 is operated under normal operating condition for the purpose of adjusting the load of the water turbine, as rapid opening and closure are not effected over the entire stroke and hence the speed variation of the water turbine is small, the guide vanes may be opened or closed linearly.

If the stroke of the spool 14a of the distributing valve 4 responsive to a closing signal were less than stroke Y, since the pressure within conduits 18 and 22 is zero, the throttle transfer valve 14 will open so that the operating speed of servo-motor 1 may be linear corresponding to the stroke of the spool 4a of the pressure distributing valve 4 as shown by dash and dot lines in FIG. 2.

Figure 5:
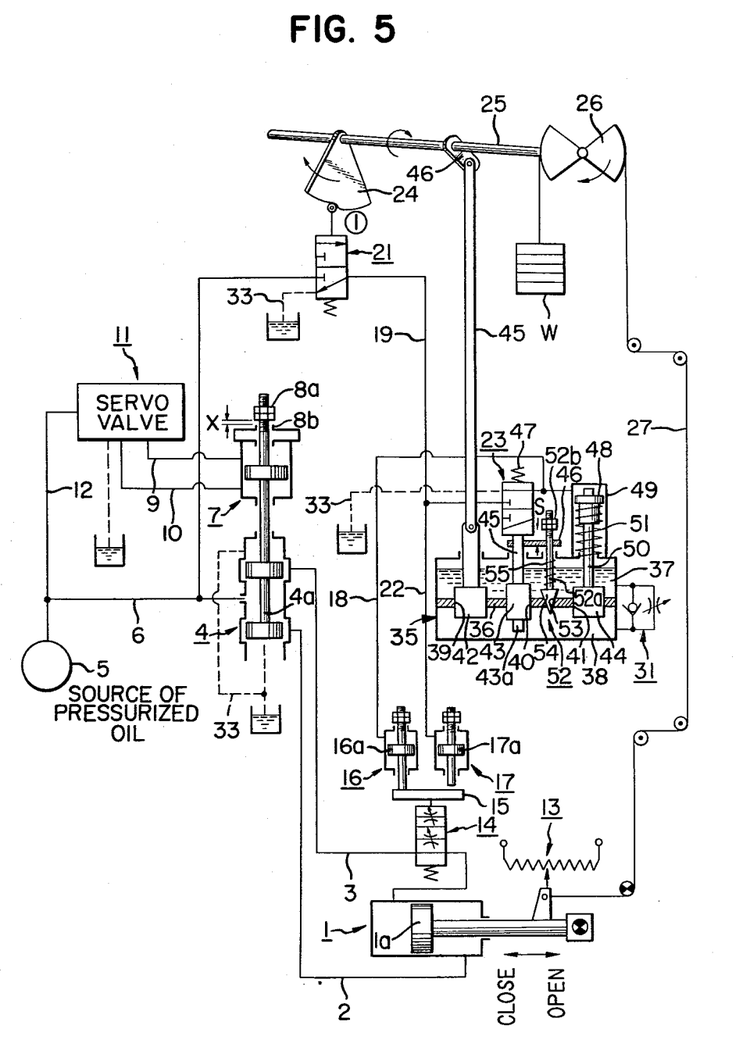
FIG. 5 is a diagram showing a modified embodiment of this invention.

FIG. 5 shows a modified embodiment of this invention in which elements corresponding to those shown in FIG. 3 are designated by the same reference characters.

In this embodiment, the time delay opening of the first piston-cylinder assembly is effected by a dashpot so as to effect a multi-stage closure of the guide vanes. In the following, the difference between the embodiments shown in FIGS. 3 and 5 will be described briefly.

A dashpot casing 35 is provided with its interior divided into upper and lower compartments 37 and 38 by a horizontal partition wall 36. Compartments 37 and 38 contain oil and are communicated with each other by a flow adjusting valve 31 having a check valve. The partition wall 36 is provided with three cylindrical openings 39, 40 and 41 for receiving first to third pistons 42, 43 and 44 respectively. The first piston 42 is connected to shaft 25 through a connecting rod 45 and an arm 46 so as to urge the first piston 42 into the lower compartment 38 as the servo-motor 1 is operated in the closing direction.

The second piston 43 is connected to the second transfer valve 23 through a connecting rod 45 having an arm 46 secured to an intermediate point. The second transfer valve 23 is normally urged downwardly toward the lower compartment 38 until a stop member 43a at the bottom of the piston 43 engages the bottom surface of the casing 35.

The third piston 44 causes a piston 48 to slide in a cylinder 49 by a connecting rod 50 and is normally urged upwardly by a spring 51.

A by-pass valve 52 is provided for the partition wall 36 between the second and third pistons 43 and 44. The by-pass valve 52 comprises a valve body 54 for closing a port 53, a biasing spring 55, and a stem 52a extending through arm 46 so that the port 53 is opened when arm 46 rises a predetermined stroke S.

The pressure in the lower compartment 38 is determined by the descending speed of the first piston 42 and the throttle opening of the flow adjusting valve 31 whereas the descending time of the second transfer valve 23 is determined by its stroke and the throttle opening of the flow adjusting valve 31.

The switching stroke of the second transfer valve 23 can be varied by varying the stroke S of the by-pass valve 52. As a consequence, the closing speed of the servo-motor 1 can be varied by adjusting the throttle opening of the flow adjusting valve 31, whereas the reset time of the servo-motor can also be varied by adjusting the stroke S, such adjustment being made by adjusting the position of nuts 52b threaded on valve stem 52a.

When the second transfer valve 23 is switched to the operating position, piston 48 in cylinder 49 quickly descends whereby the second piston 43 and the second transfer valve 23 are raised over a predetermined stroke. For this reason, even when the stroke of the first piston 42 is small it is possible to assure a definite delay time.

The modification shown in FIG. 5 operates as follows.

When the water turbine is running under a high output condition and when the servo-motor is in its full open position, the first transfer valve 21 is in the drain communicating position so that conduit 19 is communicated with drain conduit 33 and the pressure in the piston-cylinder assembly 17 is zero. Under these conditions, the second transfer valve 23 is at a drain communicating position so that the pressure in the piston-cylinder assembly 16 is also zero. As a consequence, the servo-motor 1 is maintained in a full open position shown in the drawing to close the guide vanes along the first stage closing characteristic.

When the load of the water wheel is interrupted under the normal operating condition described above, the speed of the water wheel increases rapidly which is detected by a speed detector. The servo-valve 11 is operated by a closing signal from the speed detector so as to supply the pressurized oil to pilot motor 7 via conduit 9. As a consequence, the spool 4a of the distributing valve 4 is lowered to operate the servo-motor 1 in the direction of closing the guide vanes. This movement of the piston 1a of the servo-motor 1 is detected by potentiometer 13 and its output is applied to servo-valve 11 through a circuit, not shown. At first, since the output signal from the speed detector is large, the spool 4a of the distributing valve 4 continues to descend together with nut 8a threaded on the shaft of the spool 4a to act as a stop. When the spool 4a descends stroke length X, it is stopped. Meanwhile the guide vanes are closed along the first stage closing characteristic shown in FIG. 2.

Rope 27 is pulled in synchronism with the closing movement of the servo-motor 1 to rotate the cam 24 in the clockwise direction via pulley 26 and shaft 25. Then, the first piston 42 is forced into the lower compartment 38 of the dash pot casing 35 through connecting rod 45. Since the pressure in the compartment 38 is determined by the flow resistance afforded by the flow adjusting valve 31 by setting this valve 31 such that the second piston 43 is operated at speeds above the third stage closing speed and below the first stage closing speed, the second piston 43 is raised when point 1 shown in FIG. 2 is reached whereby the second transfer valve 23 is switched to the operating position from the drain communicating position. Meanwhile, since conduit 19 is communicated with the drain side, the pressure in conduits 18 and 22 is zero so that the throttle transfer valve 14 is maintained in its fully opened position.

As the cam 24 reaches the switching point 1 the first transfer valve 21 is switched to the operating position from the drain communicating position. Then, the pressurized oil from source 5 is supplied to piston-cylinder assembly 16 via conduit 19 and second transfer valve 23 thus switching the throttle transfer valve 14 to the second closing position. At the same time, the pressurized oil is sent to the piston-cylinder assembly 17 through conduits 19 and 22 to urge piston 17a to a position corresponding to the third closing position of the throttle transfer valve 14. On the other hand, the pressurized oil is supplied to cylinder 49 through second transfer valve 23. Consequently, the third piston 44 is pushed down by piston 48 to begin to raise the second piston 43.

When the servo-motor 1 reaches point 1 (FIG. 2) to enter the second closing region, the oil displaced by the first piston 42 will become less than the limiting value of the flow adjusting valve 31. In other words, the displaced oil can freely flow through the flow adjusting valve. Thus, the second piston 43 gradually descends under the bias of spring 47 so that at the end of the stroke of the second piston 43, the conduit 18 is switched to the drain communicating position. Accordingly, the piston 16a of the piston-cylinder assembly 16 rises thereby switching the throttle transfer valve 14 to the third throttle position. Thereafter, the servo-motor closes the guide vanes along the third stage characteristic 2-3 shown in FIG. 2 at the third closing speed.

When the load is interrupted before the first transfer valve 21 reaches the switching point, the dash pot would not operate, since the second transfer valve 23 is in the drain communicating position and the piston-cylinder assembly that determines the second closing speed is under no pressure condition, so that the servo-motor moves along a dot and dash lines b shown in FIG. 2 at the third closing speed. Where the closing speed corresponding to the closing signal applied to the servo-valve 11 is lower than the third closing speed determined by the piston 17a of the piston-cylinder assembly 17 the closing speed of the servo-motor is shown by a straight line d (shown in FIG. 2) corresponding to the position of spool 4a of distributing valve 4.

Figure 6:
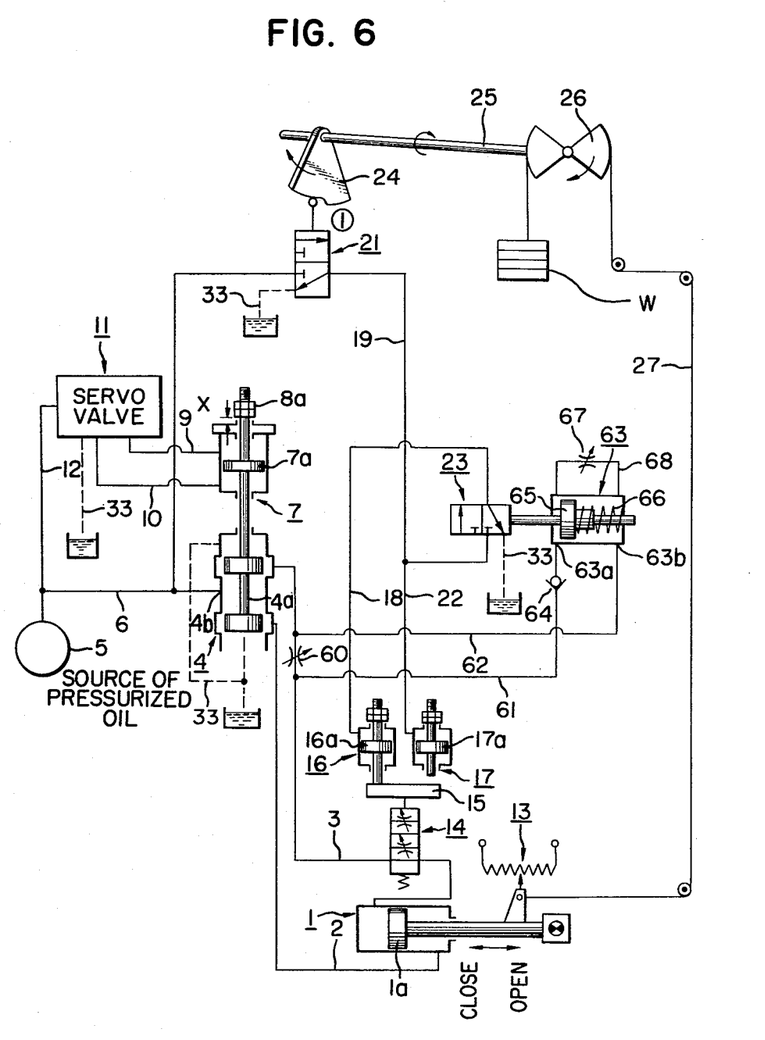
FIG. 6 is a diagram showing a still further modification of this invention.

FIG. 6 shows still another modification of this invention in which elements corresponding to those shown in FIG. 5 are designated by the same reference characters. This embodiment differs from that shown in FIG. 5 in that the closing speed of the servo-motor 1 is determined by the pressure difference of the operating oil.

More particularly, a variable throttle valve 60 is connected in series with the exhaust conduit 3 of the servo-motor 1 and conduits 61 and 62 leading to a piston-cylinder assembly 63 are connected across the throttle valve 60. The piston-cylinder assembly 63 acts as a time delay device for switching the second transfer valve 23 with a time delay. When the servo-motor 1 operates in the closing direction, the high pressure side of the variable throttle valve 60 is connected to the lefthand port 63a of the piston cylinder assembly 63 via a check valve 64 and conduit 61. The piston 65 of the piston-cylinder assembly 63 is biased against the second transfer valve 23 by a spring 66 while the opposite ends of the cylinder are interconnected by a by-pass conduit 68 provided with a variable throttle valve 67.

The modified embodiment shown in FIG. 6 operates as follows.

When the water turbine is operating under full load so that the servo-motor 1 is at the full open position, the first transfer valve 21 is at the drain communicating position so that the conduit 19 is switched to the drain side and the piston-cylinder assembly 17 is under no pressure condition. Also as the second transfer valve 23 is at the drain communicating position and the piston-cylinder assembly 16 is under no pressure condition, the throttle transfer valve 14 is maintained at the fully open position shown in the drawing to operate the guide vanes at the first closing speed.

Under this normal operating condition, when the load is interrupted the speed of the water turbine increases rapidly. This speed rise is detected by a speed detector and the servo-valve 11 is actuated by a closing signal generated by the speed detector to supply the pressurized oil to the pilot motor 7 via conduit 9 for starting the servo-motor 1 in the closing direction by lowering spool 4a of the distributing valve 4. The oil in conduit 3 discharged from the servo-motor creates a pressure drop across the variable throttle valve 60 which moves piston 65 to the right against the force of spring 66 thereby switching the second transfer valve 23 to the operating position from the drain communicating position shown in FIG. 6. At this time, the movement of the piston 1a of the servo-motor 1 is detected by potentiometer 13 and its output signal is transmitted to the servo-valve 11. At first, since the detected speed signal is large, the spool 4a of the distributing valve 4 is lowered quickly and stopped after stroke X by stop 8a. Meanwhile, the guide vanes are closed along the first stage closing characteristic 0-1, FIG. 2.

As the servo-motor moves in the closing direction, cam 24 is rotated in the clockwise direction through rope 27, pulley 26 and shaft 25. As the cam 24 reaches the switching point 1 first transfer valve 21 is switched to the operating position from the drain communicating position shown in FIG. 6. Then, the pressurized oil is supplied to the piston-cylinder assembly 16 via conduit 19 and second transfer valve 23 thus switching the throttle transfer valve 14 to the second closing position. At the same time, the pressurized oil is supplied to the piston-cylinder assembly 17 to advance its piston 17a to a position at which the throttle transfer valve 14 assumes the third closing speed.

When the operating speed of the servo-motor reduces to a slow closing speed, the pressure drop across the variable throttle valve 60 decreases so that the piston 65 is urged against the second transfer valve 23 by spring 66. At this time, the oil to the left of piston 65 gradually flows to the right, the flow rate being determined by the variable throttle valve 67. At the end of the stroke, the piston 65 switches the second transfer valve 23 to the drain communicating position from the operating position, thereby retracting the piston 16a of the piston-cylinder assembly 16. As a consequence, the throttle transfer valve 14 is switched to the third throttle position determined by the position of the piston 17a. Thereafter, the guide vanes are closed along the third stage closing characteristic 2-3 (FIG. 2) at the third closing speed.

We claim:

1. Apparatus for closing guide vanes of a hydraulic machine comprising a servo-motor for operating the guide vanes, a distributing valve responsive to the variation in the speed of said hydraulic machine for supplying and discharging operating fluid to and from said servo-motor, a throttle transfer valve for stepwisely varying the flow of the operating fluid discharged from said servo-motor thereby stepwisely varying the closing speed of said guide vanes successively through first, second and third closing speeds, a first fluid actuator for operating said throttle transfer valve to a position for setting said second closing speed.

a second fluid actuator for operating said throttle transfer valve to a position for setting said third closing speed, conduit means for supplying operating fluid to said first and second fluid actuators from a source of operating fluid, a first transfer valve for selectively connecting said conduit means to said source, means responsive to the closing operation of said servo-motor for switching said first transfer valve to an operating position for connecting said conduit means to said source when said servo-motor moves over a first closing stroke, a second transfer valve connected in series with a conduit for supplying and discharging said operating fluid to and from said first fluid actuator, and a time delay means connected to said second transfer valve for discharging the operating fluid from said first fluid actuator when said servo-motor completes a second closing stroke, thereby stepwisely closing said guide vanes at different closing speeds.

2. The apparatus according to claim 1 wherein said time delay means comprises a piston-cylinder assembly, and a flow quantity adjusting valve means including a check valve for supplying the operating fluid to said piston-cylinder assembly when said guide vanes complete a second closing stroke for switching said second transfer valve to drain side thus discharging said operating fluid from said first fluid actuator.

3. The apparatus according to claim 1 wherein said time delay means comprises first dash pot means responsive to the closing speed of said servo-motor and second dash pot means connected to said second transfer valve for controlling supply and discharge of the operating fluid to and from said first fluid actuator, thereby switching said second transfer valve to drain a side from an operating position thereby discharging the operating fluid from said first fluid actuator with a time delay when said guide vanes complete a second closing stroke.

4. The apparatus according to claim 1 wherein said time delay means comprises a dash pot including a casing containing fluid, a partition wall dividing the interior of said casing into upper and lower compartments, first, second and third pistons extending through said partition wall, said first piston being operated in accordance with the operation of said servo-motor, said second piston being operatively connected to said second transfer valve, and said third piston being operated by a piston-cylinder assembly connected in parallel with said first fluid actuator, a bypass valve extending through said partition wall and operated by said second piston, and a flow adjusting means connected between said upper and lower compartments.

5. The apparatus according to claim 1 wherein said time delay means comprises a throttle valve connected in series with a conduit which passes the operating fluid discharged from said servo-motor, a piston-cylinder assembly for actuating said second transfer valve, means for connecting the opposite ends of the cylinder of said piston-cylinder assembly across said throttle valve, and a conduit including flow restricting means connected between the opposite ends of said cylinder.

6. The apparatus according to claim 2 which further comprises a servo-valve responsive to the speed of the hydraulic machine and the stroke of said servo-motor, a pilot motor controlled by said servo-valve for actuating said distributing valve and a flow path transfer valve controlled by the movement of said pilot motor for controlling a fluid connection between said first transfer valve and said second fluid actuator.

* * * * *